United States Patent
Yeh et al.

(10) Patent No.: US 10,170,856 B2
(45) Date of Patent: Jan. 1, 2019

(54) OPTICAL TRANSCEIVER

(71) Applicant: Prime World International Holdings Ltd., New Taipei (TW)

(72) Inventors: Che-Shou Yeh, New Taipei (TW); Hsuan-Chen Shiu, New Taipei (TW); Yu Chen, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/902,536

(22) Filed: Feb. 22, 2018

(65) Prior Publication Data
US 2018/0254581 A1    Sep. 6, 2018

(30) Foreign Application Priority Data

Mar. 3, 2017 (TW) .............................. 106107125 A

(51) Int. Cl.
*H01R 13/627* (2006.01)
*H01R 13/633* (2006.01)
*H01R 13/635* (2006.01)

(52) U.S. Cl.
CPC ....... *H01R 13/6272* (2013.01); *H01R 13/635* (2013.01); *H01R 13/6335* (2013.01)

(58) Field of Classification Search
CPC ............ H01R 13/6272; H01R 13/6335; H01R 13/655
USPC ......................................................... 439/153
See application file for complete search history.

(56) References Cited

U.S. PATENT DOCUMENTS

| | | | | |
|---|---|---|---|---|
| 6,464,403 B1* | 10/2002 | Koch | ................... | G02B 6/3893 385/139 |
| 6,908,323 B2* | 6/2005 | Ice | ........................ | G02B 6/4201 361/728 |
| 7,213,979 B2* | 5/2007 | Park | ...................... | G02B 6/4292 385/136 |
| 7,402,070 B1* | 7/2008 | Wu | ...................... | H01R 13/635 439/152 |
| 7,445,485 B1* | 11/2008 | Wu | ...................... | H01R 13/514 439/160 |
| 7,540,755 B1* | 6/2009 | Wu | .................... | H01R 13/6275 439/352 |
| 8,169,783 B2* | 5/2012 | Phillips | .............. | H01R 13/6275 361/728 |
| 8,435,062 B2* | 5/2013 | Lange | ................ | H01R 13/6272 439/350 |

(Continued)

*Primary Examiner* — Alexander Gilman
(74) *Attorney, Agent, or Firm* — Grossman Tucker Perreault & Pfleger, PLLC

(57) ABSTRACT

An optical transceiver includes a case, a support, a driving member, a fastening member and a restoring member. The support is disposed on outer surface of the case. The driving member is on the support. The driving member is movable in press direction. The fastening member includes a pivot shaft, a fastening portion and a pressed portion. The pivot shaft is between the fastening portion and the pressed portion. The pivot shaft is pivoted to the support. The pressed portion has a pressed point, and the press direction is not parallel to a virtual line passing through the pressed point and the pivot shaft. When the driving member is moved to press the pressed point, the fastening member is pivoted to in fastened position or released position. The restoring member and the pressed portion are located on the side of the pivot shaft away from the second fastening portion.

10 Claims, 9 Drawing Sheets

(56) References Cited

U.S. PATENT DOCUMENTS

| | | | | |
|---|---|---|---|---|
| 8,562,373 B2* | 10/2013 | Wu | ................... | H01R 13/6335 |
| | | | | 439/352 |
| 8,585,426 B2* | 11/2013 | Zerebilov | .......... | H01R 13/6335 |
| | | | | 439/370 |
| 8,597,045 B2* | 12/2013 | Zhu | ..................... | H01R 13/506 |
| | | | | 439/357 |
| 8,787,025 B2* | 7/2014 | Wu | ................... | H01R 13/6275 |
| | | | | 361/740 |
| 9,568,690 B2* | 2/2017 | Ista | ..................... | G02B 6/3807 |
| 9,853,397 B1* | 12/2017 | Bucher | ............. | H01R 13/6335 |
| 2005/0106924 A1* | 5/2005 | Roese | ............... | H01R 13/6273 |
| | | | | 439/352 |

* cited by examiner

OPTICAL TRANSCEIVER

CROSS-REFERENCE TO RELATED APPLICATIONS

This non-provisional application claims priority under 35 U.S.C. § 119(a) to Patent Application No. 106107125 filed in Taiwan on Mar. 3, 2017, the entire contents of which are hereby incorporated by reference.

TECHNICAL FIELD

The disclosure relates to an optical transceiver, more particularly to a pluggable optical transceiver.

BACKGROUND

Optical transceivers are commonly used in modern high-speed communication networks. Generally, the optical transceivers are pluggable into a receptacle of a communication device, which is beneficial to improve the design flexibility and to perform maintenance. The receptacle is disposed on a circuit board. The XFP (10 Gigabit Small Form Factor Pluggable) and the QSFP (Quad Small Form-factor Pluggable) are standards for the optical transceivers in order to define the electrical and the mechanical interfaces between the optical transceiver and the corresponding receptacle.

SUMMARY

The present disclosure provides an optical transceiver.

One embodiment of the disclosure provides an optical transceiver adaptive to be plugged into a receptacle having a first fastened portion. The optical transceiver includes a casing, a support, a driving member, a fastening member and a restoring member. The support is disposed on an outer surface of the casing. The driving member is disposed on the support and movable with respect to the support in a press direction. The fastening member includes a pivot shaft, a second fastening portion and a pressed portion connected to one another. The pivot shaft is located between the second fastening portion and the pressed portion, and the pivot shaft is pivoted to the support. The pressed portion has a pressed point, and the press direction is not parallel to a virtual line passing through the pressed point and the pivot shaft. When the driving member is moved in the press direction to press the pressed point, the fastening member is pivoted with respect to the support. The fastening member that is pivotable with respect to the support is to be either in a fastened position or a released position. The restoring member is disposed on the support, and the restoring member and the pressed portion are both disposed on the side of the pivot shaft of the fastening member away from the second fastening portion. When the fastening member is in the released position, the restoring member is pressed by the pressed portion to store elastic energy for moving the fastening member from the released position to the fastened position. When the fastening member is in the fastened position, the second fastening portion is fastened to the first fastening portion; when the fastening member is in the released position, the second fastening portion is removed from the first fastening portion.

BRIEF DESCRIPTION OF THE DRAWINGS

The present disclosure will become more fully understood from the detailed description given here in below and the accompanying drawings which are given by way of illustration only and thus are not intending to limit the present disclosure and wherein.

DETAILED DESCRIPTION

Figure 1:
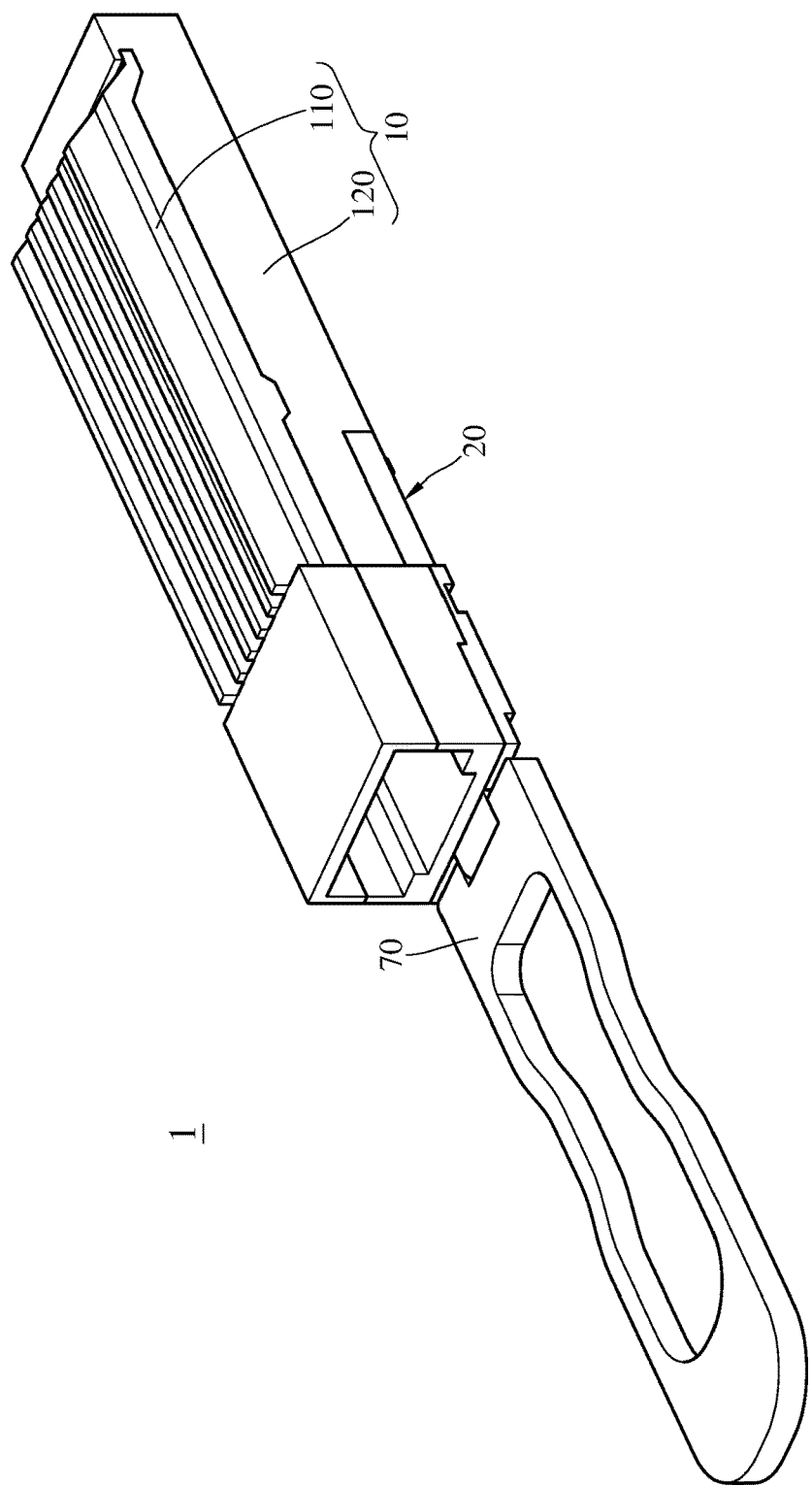
FIG. 1 is a perspective view of an optical transceiver in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
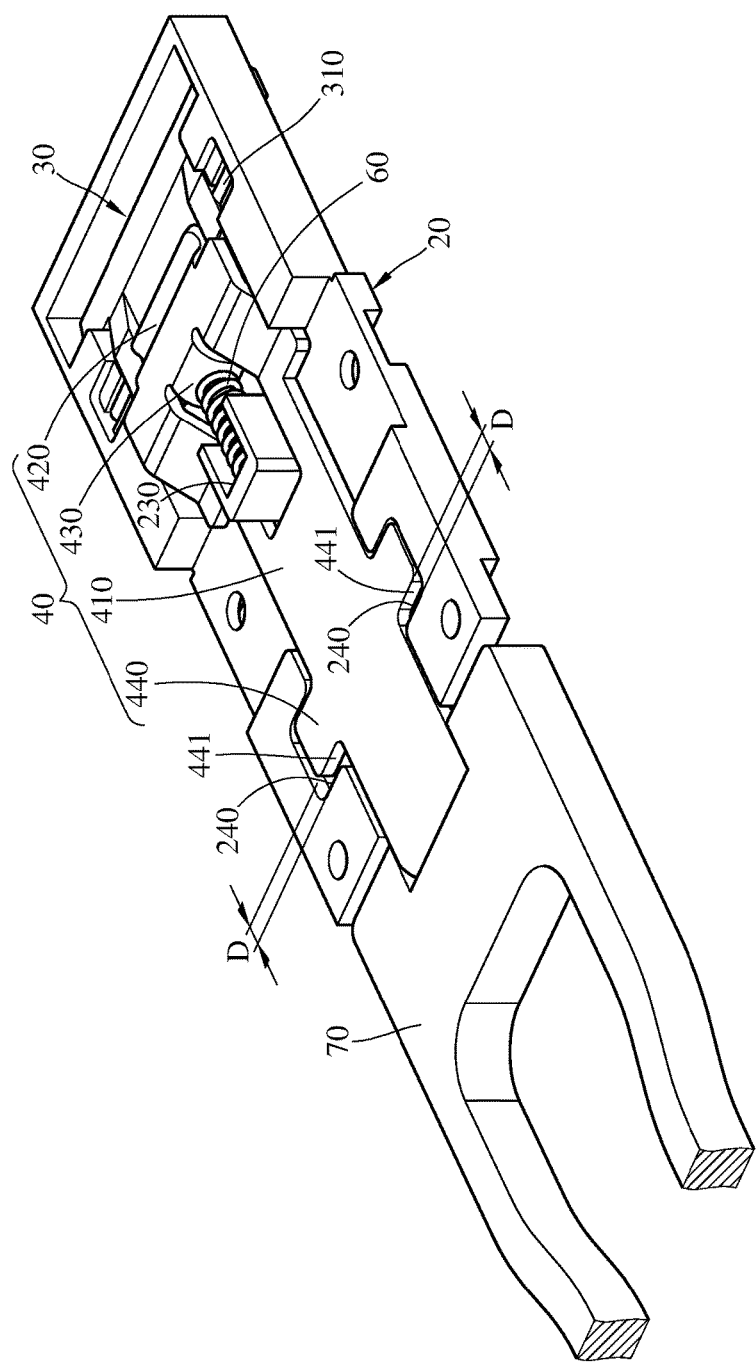
FIG. 2 is a perspective view of the optical transceiver in FIG. 1.
Figure 3:
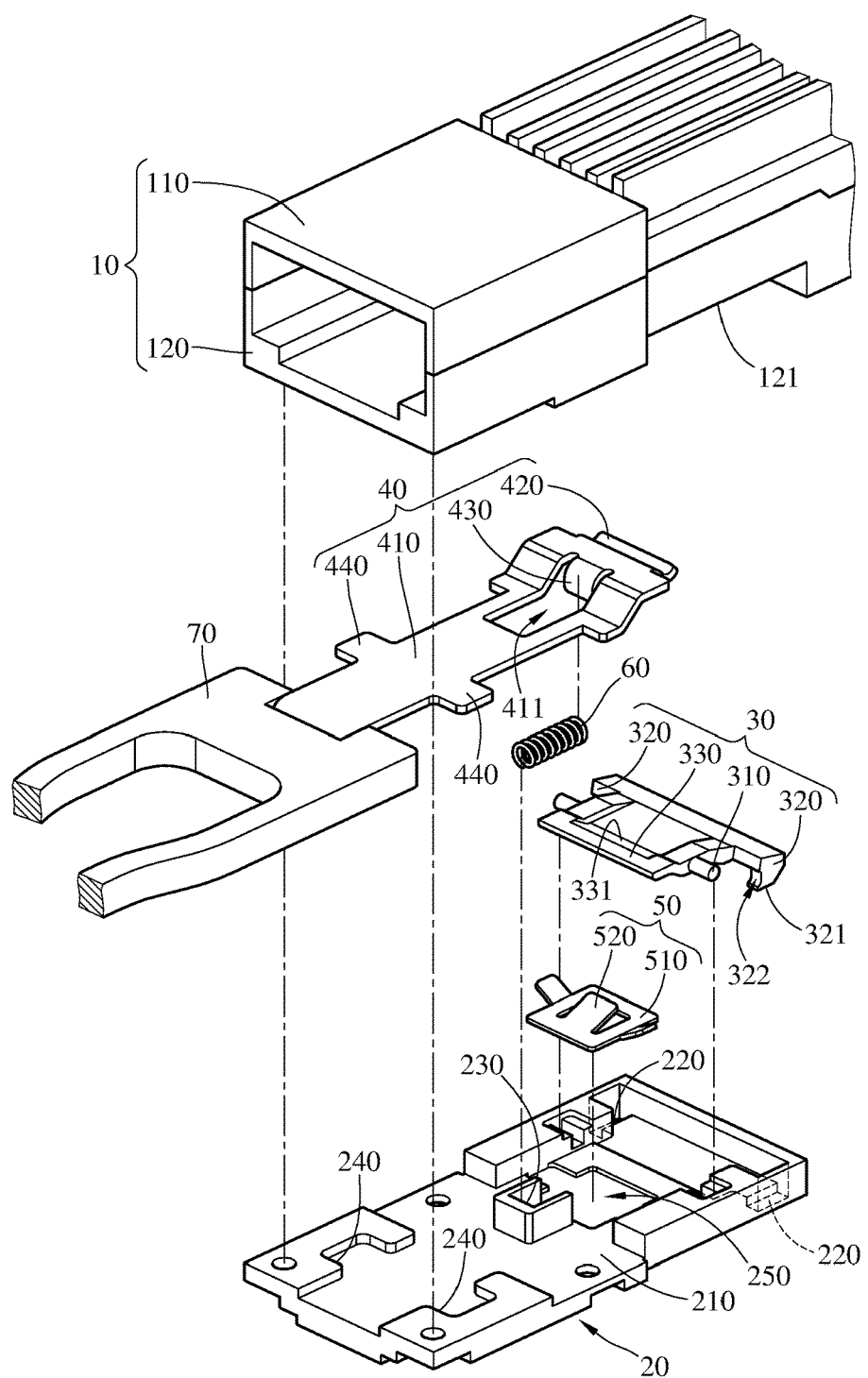
FIG. 3 is an exploded view of the optical transceiver in FIG. 1.
Figure 4:
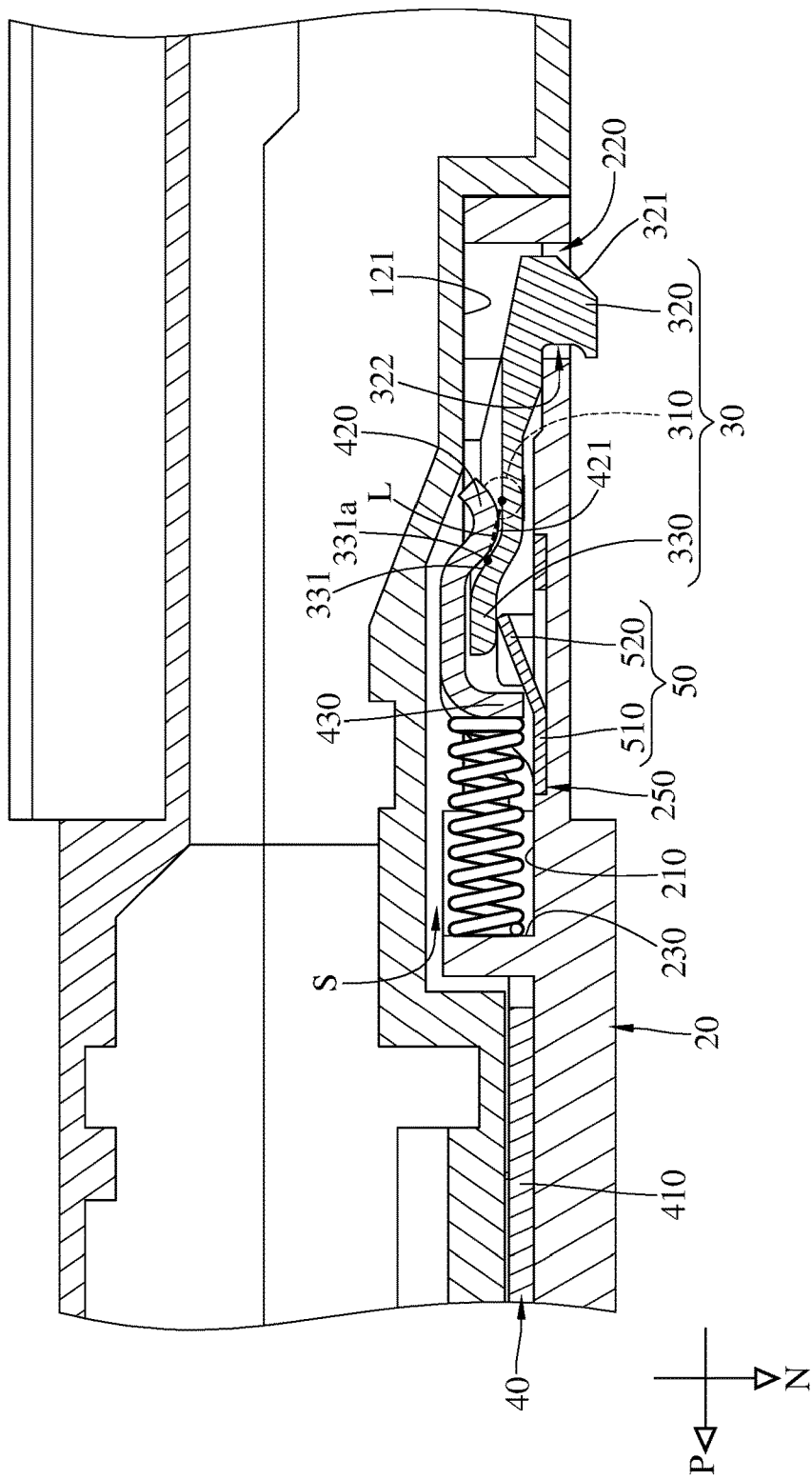
FIG. 4 is a cross-sectional view of the optical transceiver in FIG. 1.
Figure 5A:
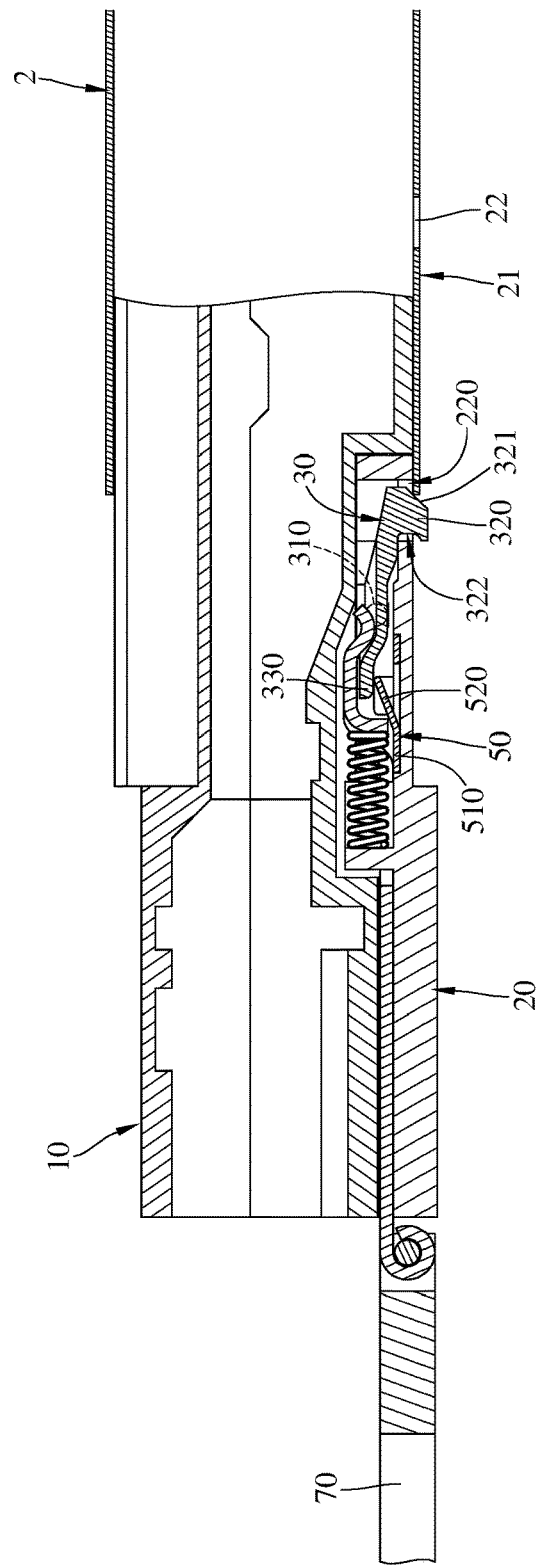
FIGS. 5A-5C are cross-sectional views of the optical transceiver in FIG. 4 plugged into a receptacle.

Please refer to FIG. 1 to FIG. 4. FIG. 1 is a perspective view of an optical transceiver in accordance with one embodiment of the disclosure. FIG. 2 is a perspective view of the optical transceiver in FIG. 1. FIG. 3 is an exploded view of the optical transceiver in FIG. 1. FIG. 4 is a cross-sectional view of the optical transceiver in FIG. 1. In this embodiment, an optical transceiver 1 is provided. The optical transceiver 1 includes a casing 10, a support 20, a fastening member 30, a driving member 40, a restoring member 50 and an elastic member 60. The optical transceiver 1 is pluggable into a receptacle (e.g., a receptacle 2 as shown in FIG. 5A). The receptacle 2 has a first fastening portion 21. The first fastening portion 21 has two fastening holes 22 in this embodiment. It is worth noting that the number of the fastening holes is not limited as the result. For example, in other embodiments, the number of the fastening hole on the first fastening portion could be one.

The casing 10 has a top casing 110 and a bottom casing 120 connecting to each other. The bottom casing 120 has an outer surface 121. The casing 10 could have a transmitter optical subassembly (TOSA) and a receiver optical subassembly (ROSA) accommodated therein. However, the configuration of the casing 10 is not limited as the result. In other embodiments, the top casing 110 and the bottom casing 120 could be implemented in terms of a single unit.

The support 20 is disposed on the outer surface 121 of the bottom casing 120 of the casing 10. In detail, the support 20 has a supporting surface 210 facing the outer surface 121, and the outer surface 121 and the supporting surface define an accommodating space S inbetween. The support 20 has two through holes 220 on the supporting surface 210, and the two through holes 220 respectively correspond to the two fastening holes 22 of the receptacle 2.

The fastening member 30 is located in the accommodating space S, and is disposed on the supporting surface 210 of the support 20. The fastening member 30 includes a pivot shaft 310, two second fastening portions 320 and a pressed portion 330 connected to one another. The pivot shaft 310 is located between the second fastening portions 320 and the pressed portion 330, and is pivoted to the support 20. The two second fastening portions 320 respectively correspond to the two through holes 220 of the support 20. The pressed portion 330 has a first inclined surface 331, and the first inclined surface 331 has a pressed point 331*a*. Each of the second fastening portions 320 has a guiding inclined surface 321.

Figure 5B:
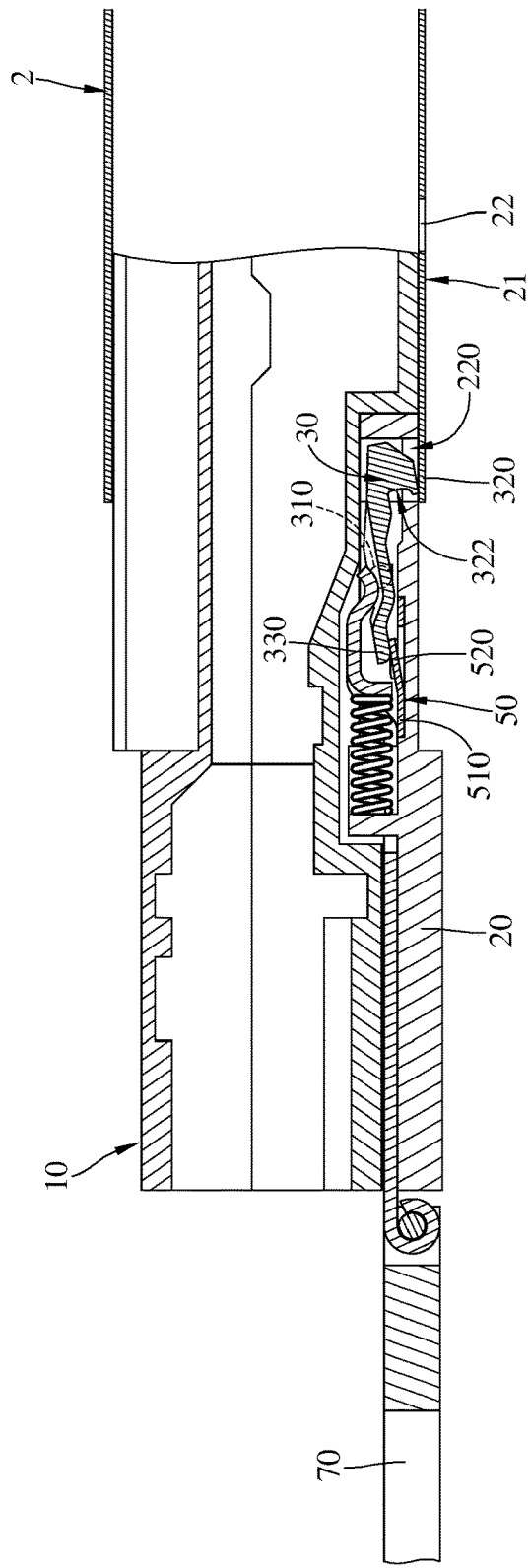

The driving member 40 is located in the accommodating space S, and the driving member 40 is movable with respect to the support 20 in a press direction P. The press direction P is substantially orthogonal to the normal direction N of the outer surface 121 of bottom casing 120 of the casing 10. In detail, the driving member 40 includes a trunk portion 410 and a first pressing portion 420 connected to each other. The first pressing portion 420 has a second inclined surface 421 facing the first inclined surface 331 of the fastening member 30. While the driving member 40 is moved with respect to the support 20 along the press direction P, the second inclined surface 421 of the first pressing portion 420 presses the first inclined surface 331 of the fastening member 30 so as to force the fastening member 30 to pivot with respect to the support 20. The fastening member 30 is pivotable to be either in a fastened position (as shown in FIG. 4) or a released position (as shown in FIG. 5B). In detail, when the driving member 40 moves along the press direction P to press the fastening member 30, the second inclined surface 421 presses the pressed point 331*a* on the first inclined surface 331, and the press direction P is not parallel to a virtual line L passing through the pressed point 331*a* and the pivot shaft 310 of the fastening member 30. Therefore, a torque is produced on the pressed point 331*a* to pivot the fastening member 30 while the driving member 40 presses the fastening member 30. In this embodiment, the driving member 40 could press the pressed portions 330 through point contact, line contact or surface contact.

The restoring member 50 is, for example, an elastic piece. The restoring member 50 is disposed in the accommodating space S. In detail, the restoring member 50 includes a base 510 and a flexible portion 520 connected to each other. The base 510 is disposed on the supporting surface 210 of the support 20, and the flexible portion 520 extends from the base 510 toward the pressed portion 330 of the fastening member 30. The pressed portion 330 of the fastening member 30 is located between the restoring member 50 and the first pressing portion 420 of the driving member 40. The restoring member 50 and the pressed portion 330 of the fastening member 30 are both located on the side of the pivot shaft 310 of the fastening member 30 far away from the second fastening portion 320. For example, from the view of FIG. 4, the second fastening portion 320 is located on the right side of the pivot shaft 310, and the restoring member 50 and the pressed portion 330 are both located on the left side of the pivot shaft 310. When the fastening member 30 is in the fastened position, the fastening member 30 may be slightly in contact with or not in contact with the pressed end 520 of the restoring member 50. When the fastening member 30 is in the released position, the restoring member 50 is pressed by the fastening member 30 to store elastic energy. The restoring member 50 is able to release the elastic energy to move the fastening member 30 from the released position to the fastened position.

The elastic member 60 is, for example, a compression spring. The elastic member 60 is disposed in the accommodating space S. In this embodiment, the support 20 further has a restricting surface 230, and the driving member 40 further includes a second pressing portion 430. The trunk portion 410 of the driving member 40 has an accommodating slot 411. The second pressing portion 430 is located on a side of the accommodating slot 411. The elastic member 60 is disposed between the second pressing portion 430 and the restricting surface 230.

Figure 5C:
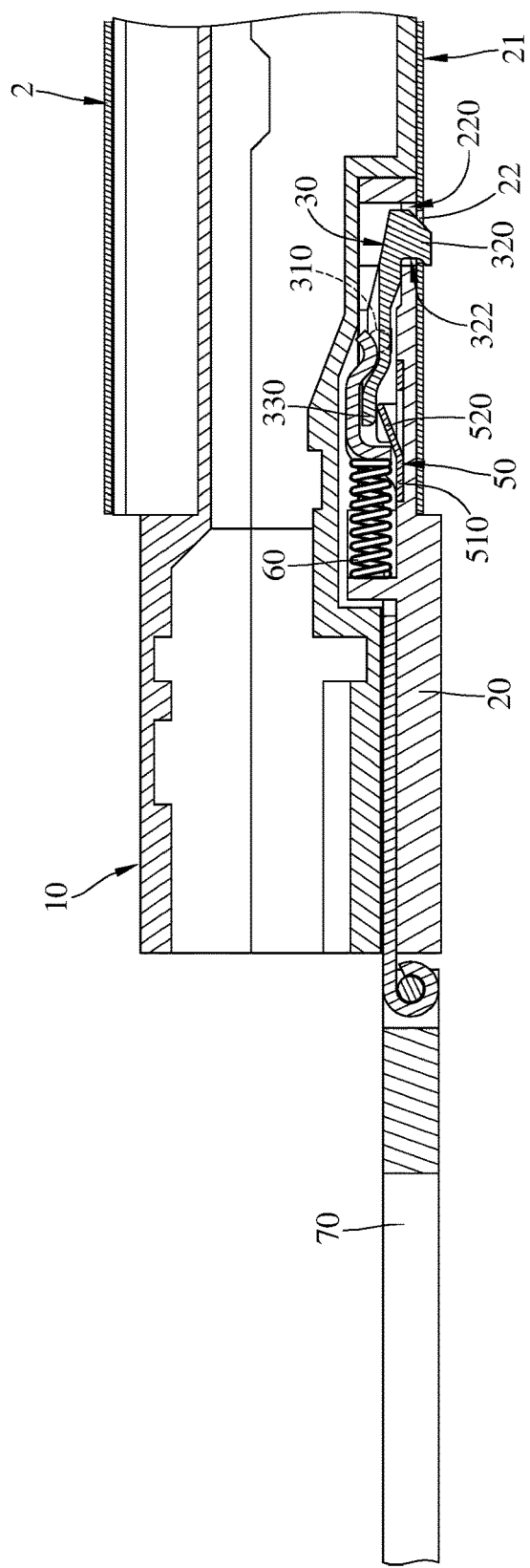

Please refer to FIG. 4 to FIG. 5C. FIG. 4 is a cross-sectional view of the optical transceiver in FIG. 1. FIG. 5A to FIG. 5C are cross-sectional views of the optical transceiver in FIG. 4 plugged into a receptacle. As shown in FIG. 4, the fastening member 30 is in the fastened position. The second fastening portion 320 of the fastening member 30 protrudes through the through hole 220 of the support 20, and the first pressing portion 420 of the driving member 40 faces the pressed portion 330 of the fastening member 30. At this moment, the first pressing portion 420 may have no pressure on the fastening member 30.

As shown in FIG. 5A and FIG. 5B, at the time the optical transceiver 1 is plugged into the receptacle 2, the guiding inclined surface 321 of the fastening member 30 is pressed by an edge of the receptacle 2. Due to the guiding inclined surface 321, the fastening member 30 could be moved from the fastened position to the released position by moving the casing 10. While the fastening member 30 is moved from the fastened position to the released position, the restoring member 50 is pressed by the fastening member 30 to store the elastic energy. When the fastening member 30 is in the released position, the fastening member 30 does not block the receptacle 2, allowing for the optical transceiver 1 to be plugged into the receptacle 2 smoothly.

As shown in FIG. 5C, when the casing 10 moves until the fastening hole 22 of the first fastening portion 21 is aligned with the fastening member 30, the restoring member 50 releases the elastic energy to move the second fastening portion 320 of the fastening member 30 to penetrate through the fastening hole 22 and the through hole 220. In such a case, the second fastening portion 320 is fastened to the first fastening portion 21, completing the insertion of the optical transceiver 1.

Figure 6A:
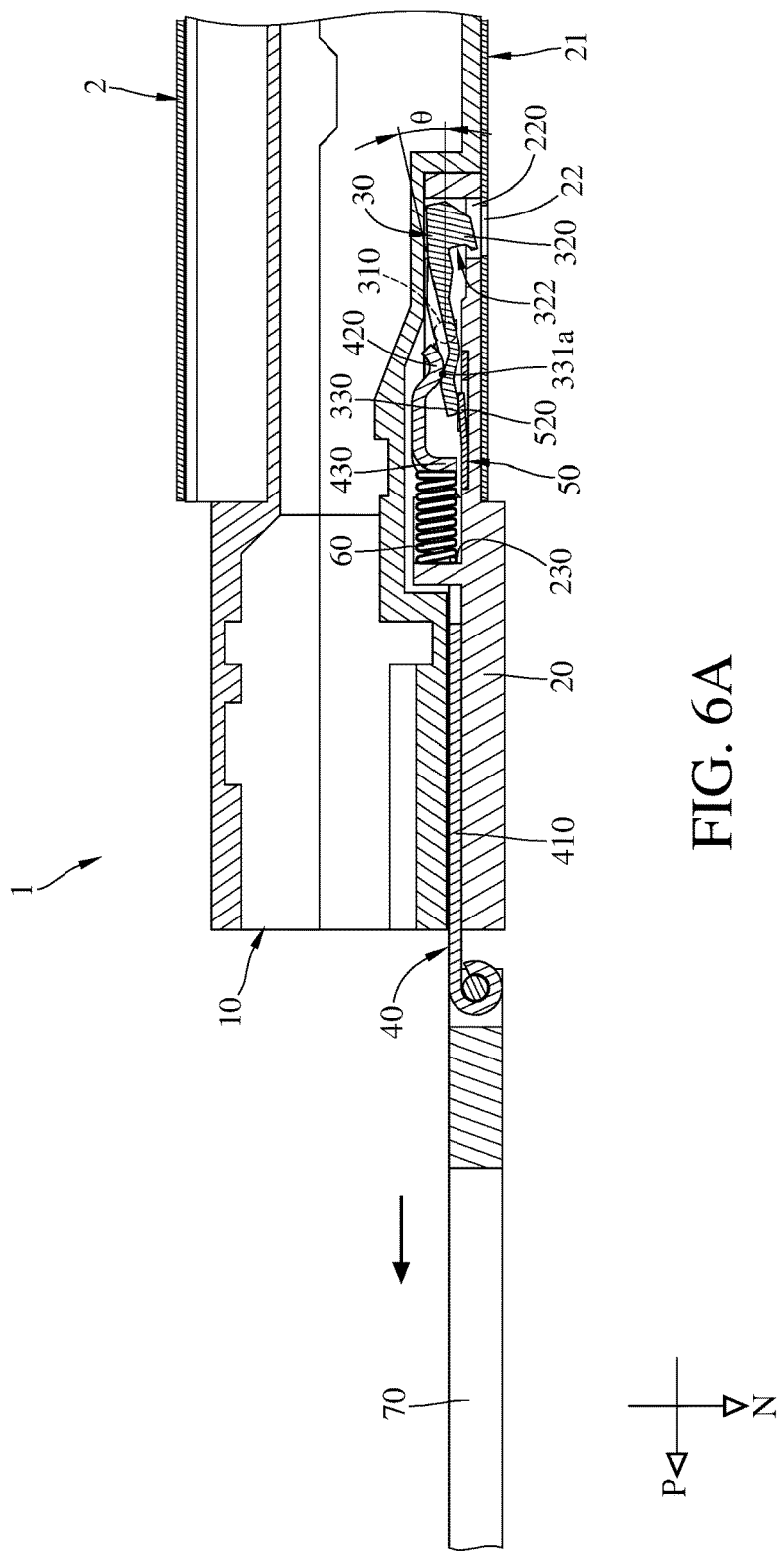
FIGS. 6A-6B are cross-sectional views of optical transceiver in the FIG. 5C pulled out from the receptacle.
Figure 6B:
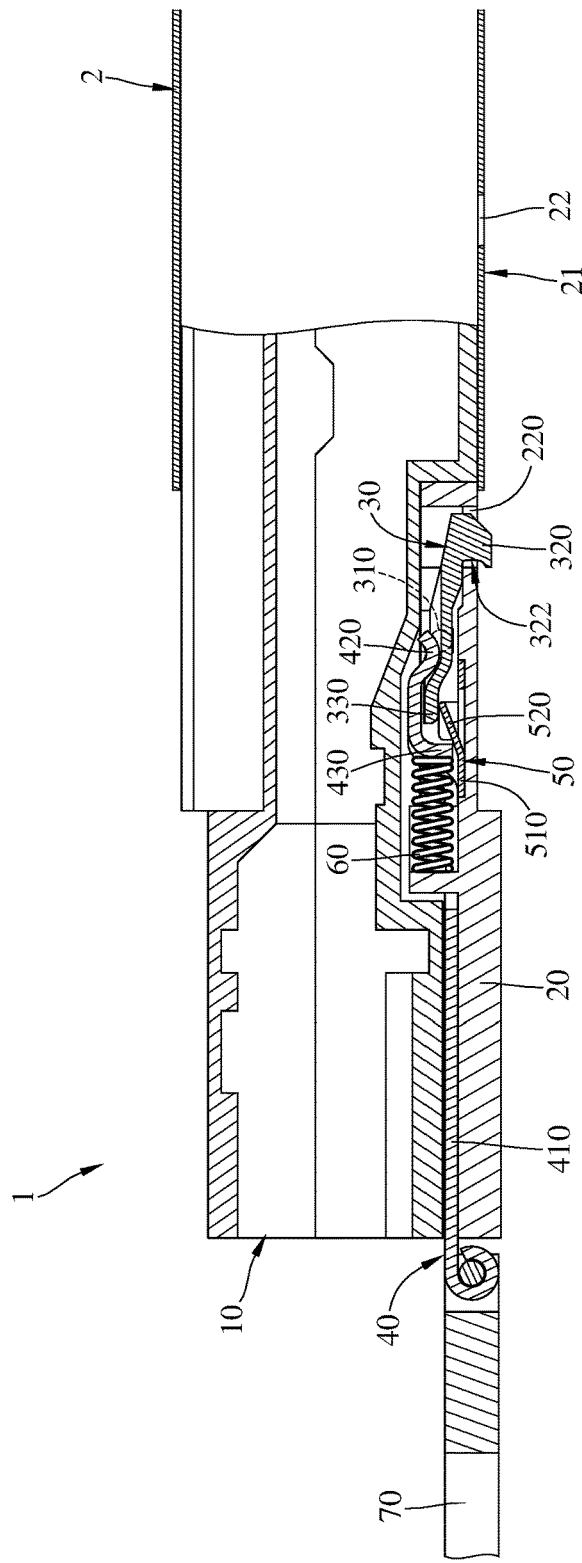

FIG. 6A and FIG. 6B, which are cross-sectional view of the optical transceiver in FIG. 5C, show the optical transceiver 1 being pulled out with the pull of the handle 70. As shown in FIG. 6A, the driving member 40 is moved along the press direction P by the pull of the handle 70. While the driving member 40 is moved along the press direction P, the first pressing portion 420 of the driving member 40 presses the pressed point 331*a* of the pressed portions 330 of the fastening member 30 so as to pivot the fastening member 30 from the fastened position to the released position. When the fastening member 30 is moved to the released position, the second fastening portion 320 is removed from the fastening hole 22 of the first fastening portion 21, allowing for the optical transceiver 1 to be pulled out from the receptacle 2 along the press direction P. In addition, when the fastening member 30 is in the released position, the restoring member 50 stores the elastic energy because the flexible portion 520 is pressed by the fastening member 30. On the other hand, when the driving member 40 is moved along the press direction P, the second pressing portion 430 is moved toward the restricting surface 230 of the support 20 to compress the elastic member 60. The elastic member 60 stores the elastic energy when being compressed.

As shown in FIG. 6B, the optical transceiver 1 is pulled out from the receptacle 2. In such a case, when the handle 70 is released, the elastic member 60 can release its elastic energy to move the driving member 40 in an opposite direction and cause the first pressing portion 420 to stop pressing the pressed portion 330 of the fastening member 30. At this moment, the restoring member 50 releases its elastic energy to move the fastening member 30 back to the fastened position to penetrate through the through hole 220.

In addition, as shown in FIG. 2 and FIG. 3, the support 20 further has two stopping surfaces 240, and the driving member 40 further includes two extending portions 440 connected to the trunk portion 410. The two extending portions 440 are respectively connected to two opposite sides of the trunk portion 410. When the fastening member 30 is in the released position, the two extending portions 440 are pressed against the two stopping surfaces 240 respectively. Therefore, when the fastening member 30 is in the released position, the stopping surface 240 could stop and prevent the extending portion 440 from moving along the press direction P despite being pulled by the handle 70. In addition, as shown in FIG. 2, there is a distance (D) of 0.80 mm to 1.0 mm between the side surface 441 of the extending portion 440 and the stopping surface 240 of the support 20. The distance D could serve to prevent excessive movement by the driving member 40. In this embodiment, the distance D is 0.90 mm.

Furthermore, please refer to FIG. 3 and FIG. 4, the support 20 further has a positioning slot 250 on the supporting surface 210. The base 510 of the restoring member 50 is disposed in the positioning slot 250, thus it is beneficial to increase the height of the flexible portion 520 in the vertical direction without increasing the thickness of the support 20.

Then, please refer to FIG. 6A. There is a pivoting angle θ between the released position and the fastened position of the fastening member 30. The pivoting angle θ is limited in a range of 9.0 to 15.0 degrees, and the limitation is beneficial for the optical transceiver 1 to be more compact. In this embodiment, the pivoting angle θ is 12.0 degrees.

Moreover, the second fastening portion 320 has a concave 322 opposite to the guiding inclined surface 321. With the concave 322, the second fastening portion 320 is prevented from hitting the inner wall of the through hole 220 or the inner wall of the fastening hole 22 when the second fastening portion 320 penetrates through the through hole 220 and the fastening hole 22.

According to the optical transceiver as discussed above, while the fastening member is pressed by the driving member, because the virtual line passing through the pressed point of the fastening member and the pivot shaft of the pivotal member is not parallel to the press direction of the driving member, a torque is produced on the pressed point to force the fastening member to pivot from the fastened position to the released position. Thus, the fastening member can be engaged with or disengaged from the fastening portion in a fast and efficient manner, rendering more convenient the use of the optical transceiver.

In addition, the restoring member and the pressed portion are both located on the side of the pivot shaft of the fastening member far away from the second fastening portion, and thus a small degree of movement of the restoring member is sufficient to move the fastening member from the released position to the fastened position The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An optical transceiver, adaptive to be plugged into a receptacle having a first fastening portion, comprising:

a casing;
a support, disposed on an outer surface of the casing;
a driving member, disposed on the support, and movable with respect to the support in a press direction;
a fastening member, comprising a pivot shaft, a second fastening portion and a pressed portion connected to one another, the pivot shaft located between the second fastening portion and the pressed portion, the pivot shaft pivoted to the support, the pressed portion having a pressed point, the press direction not parallel to a virtual line passing through the pressed point and the pivot shaft; wherein the fastening member that is pivotable with respect to the support is to be either in a fastened position or a released position; when the driving member is moved in the press direction to press the pressed point, the fastening member is pivoted with respect to the support; and
a restoring member, disposed on the support, the restoring member and the pressed portion both disposed on a side of the pivot shaft of the fastening member far away from the second fastening portion; wherein when the fastening member is in the released position, the restoring member is pressed by the pressed portion to store elastic energy for moving the fastening member from the released position to the fastened position;
wherein when the fastening member is in the fastened position, the second fastening portion is fastened to the first fastening portion; and when the fastening member is in the released position, the second fastening portion is removed from the first fastening portion.

2. The optical transceiver according to claim 1, wherein the outer surface of the casing faces the first fastening portion of the receptacle when the second fastening portion is fastened to the first fastening portion.

3. The optical transceiver according to claim 1, wherein the restoring member is an elastic piece, and the pressed portion of the fastening member is located between the restoring member and the driving member.

4. The optical transceiver according to claim 1, wherein the press direction is substantially orthogonal to a normal direction of the outer surface of the casing.

5. The optical transceiver according to claim 1, wherein the support has a supporting surface facing the outer surface of the casing, the outer surface and the supporting surface define an accommodating space inbetween, and the driving member, the fastening member and the restoring member are disposed in the accommodating space.

6. The optical transceiver according to claim 5, wherein the first fastening portion has a fastening hole, the support has a through hole and when the fastening member is in the fastened position, the second fastening portion protrudes from the through hole and is fastened to the fastening hole.

7. The optical transceiver according to claim 5, further comprising an elastic member, wherein the driving member has a trunk portion, a first pressing portion and a second pressing portion connected to one another, the trunk portion has an accommodating slot, the pressed portion of the fastening member is located between the restoring member and the first pressing portion, the pressed portion has a first inclined surface, the first pressing portion has a second inclined surface facing the first inclined surface, the first inclined surface has a pressed point, the second pressing portion is located on a side of the accommodating slot, the support further has a restricting surface, and the elastic member is disposed between the second pressing portion and the restricting surface.

8. The optical transceiver according to claim 7, wherein the driving member further comprises an extending portion protruding from the trunk portion, the support further has a stopping surface and when the fastening member is in the released position, the extending portion is pressed against the stopping surface.

9. The optical transceiver according to claim 5, wherein the support has a positioning slot on the supporting surface, the restoring member comprises a base and a flexible portion connected to each other, the base is disposed in the positioning slot, and the flexible portion extends from the base toward the pressed portion of the fastening member.

10. The optical transceiver according to claim 1, wherein the second fastening portion of the fastening member has a guiding inclined surface adaptive to press against an edge of the receptacle.

* * * * *